United States Patent

[11] 3,540,427

| | | |
|---|---|---|
| [72] | Inventor | John P. Anderson<br>Yorktown Heights, New York |
| [21] | Appl. No. | 737,132 |
| [22] | Filed | June 14, 1968 |
| [45] | Patented | Nov. 17, 1970 |
| [73] | Assignee | International Business Machines Corporation<br>Armonk, New York<br>a corporation of New York |

[54] ELECTRO-OPTIC ARRAY AND METHOD OF MAKING SAME
4 Claims, 7 Drawing Figs.

[52] U.S. Cl. .................................................. 125/21;
51/135
[51] Int. Cl. .................................................. B28d 1/08
[50] Field of Search............................................ 51/135;
125/16, 18, 21

[56] References Cited
UNITED STATES PATENTS

| | | | |
|---|---|---|---|
| 3,032,026 | 5/1962 | Raabe ........................ | 125/21 |
| 3,155,087 | 11/1964 | Dreyfus ..................... | 125/21 |
| 3,435,815 | 4/1969 | Forcier ...................... | 125/16 |

*Primary Examiner*—John F. Campbell
*Assistant Examiner*—Ronald J. Shore
*Attorney*—Hanifin and Jancin and George Baron ABSTRACT: A technique for fabricating an array of very high speed light deflecting units is described. During the fabrication of the array, one uses a cutting string wet by a constant slurry source to make single cut or plural kerfs in a desired crystal. A buffer crystal is located adjacent the desired crystal during the cutting operation so that parallel instead of V-shaped cuts are made in the desired crystal. The slots produced by the cutting strings are filled with metal to provide an array of electro-optical elements.

Patented Nov. 17, 1970

3,540,427

INVENTOR
JOHN P. ANDERSON

BY
ATTORNEY

ELECTRO-OPTIC ARRAY AND METHOD OF MAKING SAME

BACKGROUND OF THE INVENTION

Certain memories, particularly those that are addressed by a beam of light, require a laser source whose output beam can be rapidly scanned among a large number of discrete directions. As part of the scanning mechanism, an array of electro-optical elements are placed on each mirror forming the outer portions of the laser cavity. These arrays are oriented so that all parallel electro-optical elements in one array on one mirror are perpendicular to all the parallel electro-optical elements on the other mirror.

When the laser is activated or pumped, a resonating cavity for the laser is chosen so that a degenerate set of oscillating modes can be supported. When only one electro-optical element of the first array has a voltage applied across it, all transverse modes but one are extinguished. When only one electro-optical element of the second array has a voltage applied across it, then all longitudinal modes but one are extinguished. Thus, by simultaneously actuating two electro-optical elements, one in each array, two orthogonal light beams are supported in the laser cavity. The intersection of such two orthogonal beams produces a point of light. By rapidly selecting different pairs of electro-optical elements, one in each array, a spot of light can be scanned.

The material in the array used for deflecting the laser beam should be one that requires a relatively low electric field to yield a large deflection of the laser light, have good transmission to laser light and be capable of being self-supporting when cut into extremely thin sections. A material having these characteristics is lithium niobate ($LiNbO_3$). However, it has been found when the latter is being sliced, using a nylon or metal string bathed in a slurry of aluminum oxide mixed with water, the string entrains the slurry in such a manner that a V-shaped kerf is cut into the lithium niobate. Each kerf, however, should be as close to a parallel cut as is possible in that electrical potentials will be applied to electrodes on either side of a sliced section of $LiNbO_3$. If the sections are not parallel, the electro-optical effect of the $LiNbO_3$ to laser light passing through it will not be uniform throughout the length of the slice, making it almost impossible to achieve a controllable deflection of the laser light.

Thus, before one can make an electro-optical array, it is necessary to make cuts into the $LiNbO_3$ so that a plurality of thin sections of $LiNbO_3$ are substantially parallel. To achieve such parallelism, a buffer material, such as a block of silicon, is laid adjacent the $LiNbO_3$ as the cutting string and its entrained slurry is moved in a cutting action across the $LiNbO_3$ crystal. The silicon buffer takes the surplus slurry from the cutting string so by the time the string reaches the lithium niobate crystal, a uniform cut is made into the surface of such crystal. The V-shaped kerfs are made in the buffer silicon block and not in the crystal of interest, namely, the $LiNbO_3$.

By employing slurry cutting, a matted or slightly fractured surface exists on each cut section. Since it is desirable, in making an electro-optical array, that the cut sections be very close together, such matted surface allows one to electrolessly plate metal in the interstices between slices of $LiNbO_3$, such plated metal becoming part of the electrodes to which suitable potentials are applied.

In selecting the material to serve as a buffering block, one chooses silicon as the buffer for $LiNbO_3$ because the former has substantially the same conchoidal fracturing characteristics as the latter. In general, if the electro-optical material being sliced is other than $LiNbO_3$, then a material that matches the fracturing qualities of this other material is chosen as the buffer block.

Consequently, it is an object of this invention to provide a novel method for achieving uniform kerfs in a crystal.

Yet another object is to achieve uniform kerfs in an electro-optical element to be used in a light-deflecting device.

It is yet another object to employ this novel method of cutting an electro-optical crystal so as to attain a highly symmetrical array of electro-optical elements as a unitary structure.

It is yet another object to employ a method of cutting a crystal so that the ultimate construction of an array of electro-optical elements as a unitary structure is greatly simplified.

The foregoing and other objects, features and advantages of the invention will be apparent from the following more particular description of preferred embodiments of the invention, as illustrated in the accompanying drawings.

DESCRIPTION OF THE DRAWINGS

In FIG. 5, a crystal 2 to be cut for eventual use in an electro-optical device is shown being subjected to the cutting effect of two or more saws moving in the direction of the arrow. The crystal 2 is fixedly secured in a jig or holder to avoid movement of such crystal during cutting. Housing 4 is filled with a mixture 6 of aluminum oxide and water or other equivalent mixture. The top of the housing is open and contains a roller 8 that is rotated by a motor not shown. As the roller 8 rotates, it picks up the slurry 6 in housing 4 and transfers it to any number of wires or nylon strings 10 or the like moving across the surface of roller 8. As these strings move across the top surface of crystal 2, they cut into it, creating kerfs 12. Since more slurry initially exists on string 10 near the crystal edge 14 then tapers off as the string approaches crystal edge 16, the kerf 12 becomes V-shaped. As a consequence, the slice 18 does not have opposing parallel faces, making it difficult to apply electric fields across those opposing faces that will cause a uniform deflection of polarized light entering the slice 18 in a direction perpendicular to the plane of the drawing. Alternatively, instead of ganging the saws, one cut is made and then the crystal 2 is moved a predetermined distance for a second cut. Such step and repeat process can also be used to achieve the desired electro-optical array.

As seen in FIG. 6, a silicon block 20 is placed along side and in contact with the $LiNbO_3$ crystal 2 so that the slurried moving string 10 cuts the crystal 20 before cutting crystal 2. The silicon buffer block can be located so that its upper face is slightly higher than the upper face of crystal 2 so that cutting of the buffer block begins before a kerf is initiated in crystal 2. A second buffer block 22 can be used adjacent to crystal edge that is remote from the slurry source 6, but such second buffer is optional. As is seen in FIG. 6, the V-shaped kerf now takes place in the silicon buffer 20 and not in the crystal of interest.

Figure 1:
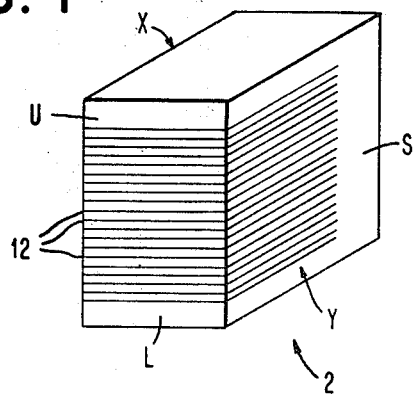
FIG. 1 is a showing of a crystal having a series of parallel grooves cut therein.

After the cutting strings 10 have penetrated the desired distance into crystal 2, movement of the cutting strings is stopped and the assembly consisting of blocks 2, 20 and 22 is flooded with water so as to gently lift the strings out of the kerfs they created. The crystal 2, at this stage, is shown in FIG. 1. Parallel kerfs 12 exist part way into crystal 2 with slices of $LiNbO_3$ between the kerfs. The comblike structure contains an upper portion U, a lower portion L and a side portion S of uncut $LiNbO_3$, and two side surfaces X and Y that were polished, alined and made optically flat before cutting began.

The sliced LiNbO₃ of FIG. 1 is now ready for receiving metallic inserts so that a slice of LiNbO₃, such as slice 26, can have metallic plates on its opposing parallel sides, which plates will have electric potentials applied thereto. Initially approximately one micron of copper 28 is electrolessly plated into the kerfs 12. There are many conventional techniques for achieving such electroless plating, but one technique is to employ an electroless CuSO₄ plating bath manufactured by the Euphone Co. When the cut LiNbO₃ crystal 2 is inserted into an agitated solution of such plating bath maintained at 75°F., ** .06 mils/hr of copper is deposited in the slotted areas. The copper film 28 strongly adheres to the LiNbO₃ so that a consequent disposition of gold, which is not adherent to the LiNbO₃, will adhere to the copper.

After the deposition of copper into the slots of the crystal 2, the latter is placed in an electroplating bath and forms the cathode of the bath and a strip of gold forms the anode of the bath. By knowing the temperature of the bath, the distance of the cathode from anode, the current used, etc., a fixed amount of gold 30 is deposited into the slots. If desired the entire slot may be filled with gold. However, it is preferred to place the LiNbO₃ crystal, after the copper and gold films have been deposited, onto a hot plate that is heated to  400°C. in a forming gas atmosphere. Indium 32, which is also heated to  400°C., is laid atop of the slots 12 and seeps into the slots, forming a eutectic with the gold. The seepage of the indium 32 is monitored with a microscope in that the LiNbO₃ is transparent. The indium 32 is allowed to seep into the slits until the latter are completely filled with indium.

Figure 2:
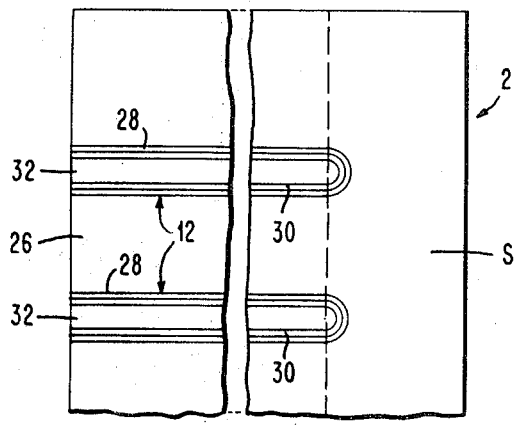
FIG. 2 is an enlarged view of two of the parallel grooves of FIG. 1, with metallic fillings inserted therein.
Figure 3:
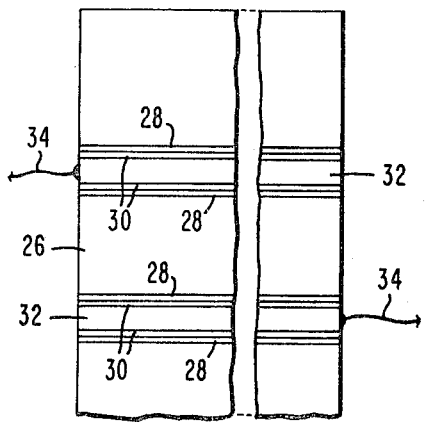
FIG. 3 is an enlarged view of contacts and leads attached to the metallic fillings.
Figure 5:
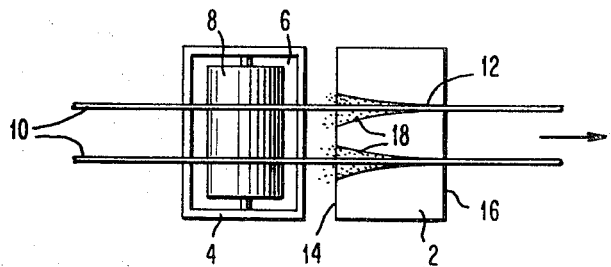
FIG. 5 is a representation of the prior art method of cutting and its attendant defects.
Figure 6:
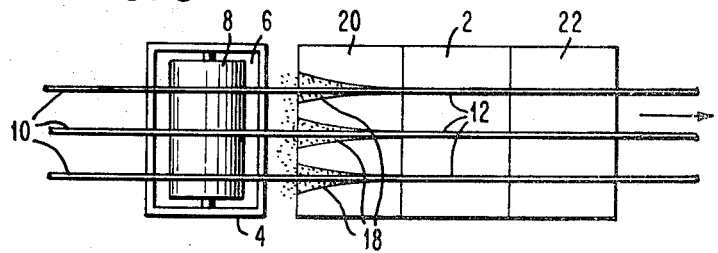
FIG. 6 is a representation of the improved method of cutting a crystal as taught by this invention.

After complete seepage of the indium 32, the LiNbO₃ is slowly brought to room temperature. Side S is lapped, as shown in FIG. 2, up to the dotted line so that the indium is exposed. One particular advantage of the aforesaid procedure lies in the fact that sides X and Y (they are perpendicular to surfaces U and L) are highly polished, alined, and flat before cutting takes place. Thus only removal of side S and surplus electrode material from the face parallel to side S is needed to complete the array. In effect, by polishing the sides X and Y while crystal 2 is in bulk form, one avoids the need to carry out such polishing after cutting has taken place, in that after cutting, crystal 2 is in slotted form, and very small in size, making the polishing step either untenable or subjecting the sliced crystal to easy breakage. At this point, a unitary, self-supporting array of electro-optical elements is formed. The upper and lower portions U and L are polished to be optically parallel within a few wave numbers.

The final step in making the array consists of bonding gold wires 34 to the indium inserts 32. Such bonding is accomplished by using a very sharp chisel of sapphire or Al₂O₃ which is heated to over 400°C., so that the indium 32 is melted to the gold wire 34.

Figure 4:
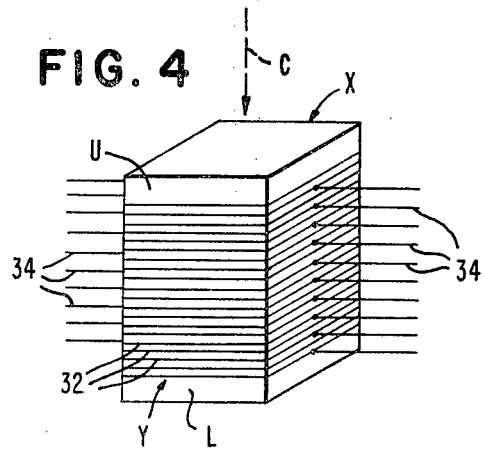
FIG. 4 is a schematic showing of a completed electro-optical array.

With proper care in manufacturing the electro-optical array in accordance with the teaching shown and described herein, LiNbO₃ sections 26 are of the order of 0.0012 inch thick and completed electrodes formed of elements 28, 32 and 34 are of the order of 0.00075 inch thick. The overall dimensions of the array or matrix are 0.30"×0.34"0.06" with the optical or C axis, as seen in FIG. 4, being parallel to the 0.06 inch dimension of the matrix array.

The manner in which such an electro-optical matrix or array can be used is obvious to most practitioners in the field of light deflection. One particular application of such an array would be in a "scanlaser", a system designed to rapidly move a spot of light produced in a lasing cavity along one of the mirrors of such cavity to provide a scanning effect. Such a scan laser is described in detail in an article entitled "The Electron Beam Scanlaser: Theoretical and Operational Studies" by R.A. Myers and R.V. Pole which appeared in the "IBM Journal of Research and Development", Vol. 11, No. 5, Sept. 1967, pp. 502–510.

Figure 7:
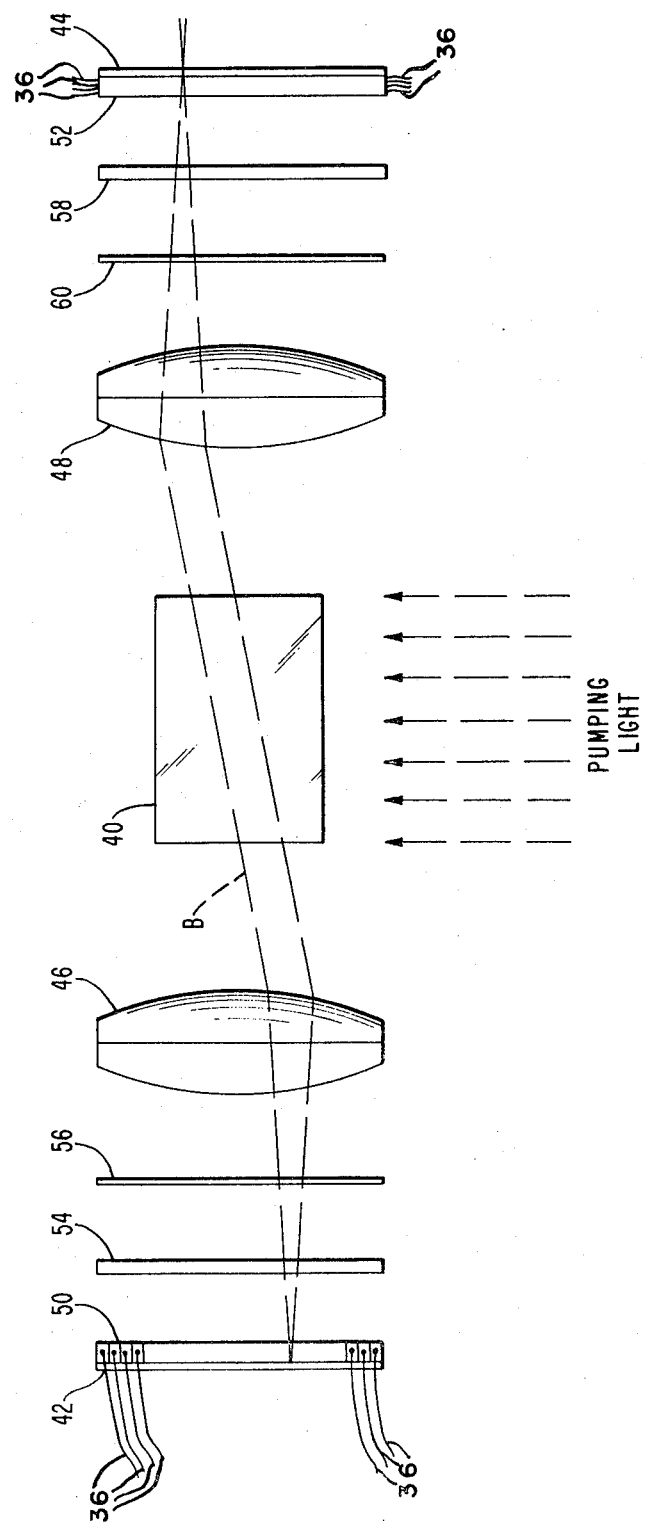
FIG. 7 is a schematic showing of a laser system wherein the electro-optical arrays made by the invention shown and described herein are employed to achieve digital mode selection.

In the laser system of FIG. 7 there is shown an active medium 40 composed of a rod of ruby, or yttrium-aluminum-garnet (YAG) doped with neodymium, that is placed in a resonant cavity bounded by optically flat mirrors 42 and 44. Lenses 46 and 48 are placed in the resonant cavity so that the mirrors 42 and 44 lie in the focal planes of the lenses. Each matrix or array 50 or 52, such as the completed array of FIG. 4, is placed adjacent a mirror, array 50 is located in close proximity to mirror 42 with its slabs 26 of LiNbO₃ horizontally oriented and matrix 52 is located adjacent to mirror 44 with its slabs 26 oriented vertically. Birefringent plate 54 and polarizer 56 are interposed between lens 46 and array 50 whereas birefringent plate 58 and polarizer 60 are located between lens 48 and array 52.

When the active medium is optically pumped, lasing is prevented from occurring in that a polarized beam B of light would traverse the lens 48, be polarized as it passed through polarizer 60, and then will have circular polarization imparted to it by the birefringent plate 58, the latter being, in effect, a $\frac{\lambda}{4}$ plate for the lasing light. If no voltage is selectively applied to any of the pair of wires 36 of the array, the lasing light is reflected from the mirror 44 and returns so that the quarter-wave plate 58 causes the polarization of the reflected light to be rotated, such rotation causing polarizer 60 to act as an analyzer to such additionally rotated light and prevent its passage back towards the active medium 40. The same situation applies to the light being reflected from mirror 42.

In general, if no selected voltages are applied to the pair of electro-optical arrays 50 and 52, birefringent or quarter-wave plates 54 and 58 attenuate the respective reflections of light in the cavity from mirrors 42 and 44. But when one horizontal slab of LiNbO₃ from one array, i.e., array 50, and one vertical slab of LiNbO₃ of the other array 52, are each actuated by applying suitable electrical potentials to their respective electrodes, then a vertical line and a horizontal of lasing light are not attenuated by their respective quarter-wave plates 54 and 58. As a consequence, the intersecting orthogonal lines of light produce a spot of light on either mirror 42 or 44 and, by rapidly selecting different orthogonal slabs of LiNbO₃, one obtains a rapidly moving spot of light.

It is to be understood that the lasing system of FIG. 7 was chosen to illustrate the manner in which the electro-optical array of FIG. 4 can be used. The array can be employed wherever multiple and rapid deflection of light is required and the dimensions of such array are required to be very small. Moreover, the specific metallic electrode materials, i.e., copper, gold and indium were chosen merely to illustrate the invention. Obviously, other equivalent metals can be employed which are capable of wetting crystal 2 and capable of being deposited into the narrow slots 12.

While the invention has been particularly shown and described with reference to preferred embodiments thereof, it will be understood by those skilled in the art that the foregoing and other changes in form and details may be made therein without departing from the spirit and scope of the invention.

I claim:

1. A method of cutting a slot in an electro-optical crystal comprising the steps of:
   a. moving a cutting string past a source of slurry so that the latter adheres to and is entrained by said string;
   b. placing a buffer material adjacent said crystal, said buffer material having substantially the same conchoidal fracturing characteristics as said electro-optical crystal; and
   c. moving said slurried cutting string so that said buffer material is cut before the crystal is cut by said slurried string.

2. A method of cutting a plurality of parallel slots in an electro-optical crystal comprising the steps of:
   a. moving a plurality of parallelly disposed cutting strings past a source of slurry so that the latter adheres to and is entrained by said strings;
   b. placing a buffer material adjacent said crystal, said buffer material having substantially the same conchoidal fracturing characteristics as said electro-optical crystal; and
   c. moving said slurried cutting strings so that said buffer material is cut before the crystal is cut by said slurried strings.

3. A method of cutting a slot in a crystal as set out in claim 1 wherein said electro-optical crystal is lithium niobate.

4. The method of claim 3 wherein said buffer material is silicon.